United States Patent
Weber

[11] Patent Number: 6,125,512
[45] Date of Patent: Oct. 3, 2000

[54] WHEELBARROW HANDLE

[76] Inventor: Tory Weber, 51 Stoney Crescent West, Lethbridge, Alberta, Canada, T1K 6V5

[21] Appl. No.: 09/304,683

[22] Filed: May 4, 1999

[51] Int. Cl.[7] .................................. B62B 7/00; A45C 3/00
[52] U.S. Cl. ............................... 16/430; 16/421; 16/900; 16/438; 280/47.31
[58] Field of Search .................. 16/421, 436, 422, 16/112.1, 900, 430, 438; 280/47.31, 47.2, 47.3, 47.315

[56] References Cited

U.S. PATENT DOCUMENTS

| | | | |
|---|---|---|---|
| 267,837 | 11/1882 | Clark | 16/112.1 |
| 1,485,179 | 2/1924 | Funk . | |
| 2,547,451 | 4/1951 | Eber | 16/111 |
| 2,901,263 | 8/1959 | Van Loon, Jr. | 280/17.31 |
| 3,173,705 | 3/1965 | De Graff Du Puy | 280/47.31 |
| 4,951,956 | 8/1990 | VIttone | 280/47.31 |
| 5,018,405 | 5/1991 | Chiu | 16/438 |
| 5,062,179 | 11/1991 | Huang | 16/436 |
| 5,184,835 | 2/1993 | Huang | 16/436 |
| 5,799,960 | 9/1998 | Davis, Jr. | 280/47.31 |
| 5,971,410 | 10/1999 | Nichols | 280/47.31 |

*Primary Examiner*—Chuck Y. Mah

[57] ABSTRACT

In an effort to facilitate the dumping of a load from a wheelbarrow the present invention provides pivoting hand grips attached to the ends of wheelbarrow handles, which enable an individual handling a wheelbarrow to maintain a constant grip on the handle while dumping. Moreover, the pivoting hand grips enable the arms of the individual to be consistently in a position of strength proximate his hips. The risk of injury, particularly back injury, is minimized by eliminating the arm extension required to dump a standard wheelbarrow. The awkward and strenuous exercise of dumping a wheelbarrow is thereby replaced by a smooth flowing action. The present invention also includes a locking mechanism for preventing the hand grips from rotating during normal stationary or travelling usage and a releasing mechanism which can be easily manipulated by the fingers of the handler while gripping the hand grips when the load is being dumped.

6 Claims, 3 Drawing Sheets

FIG. 3
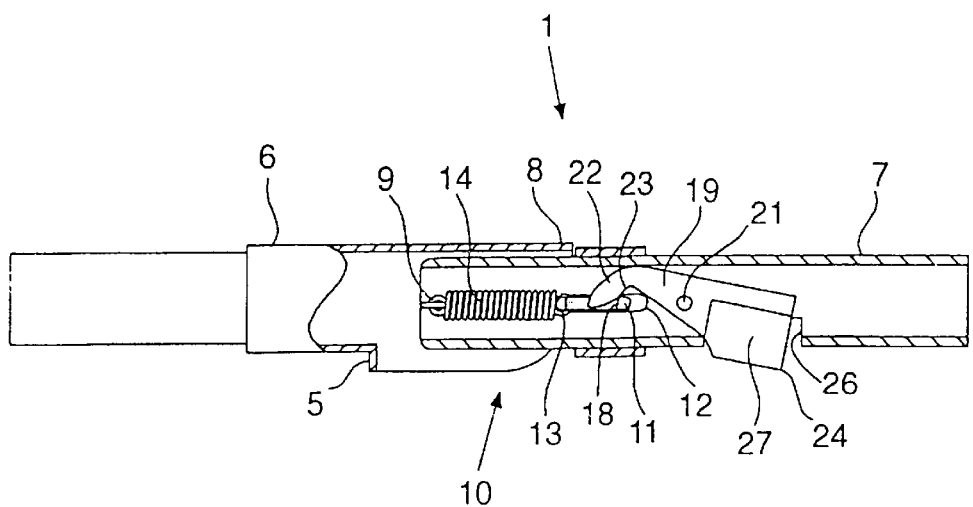
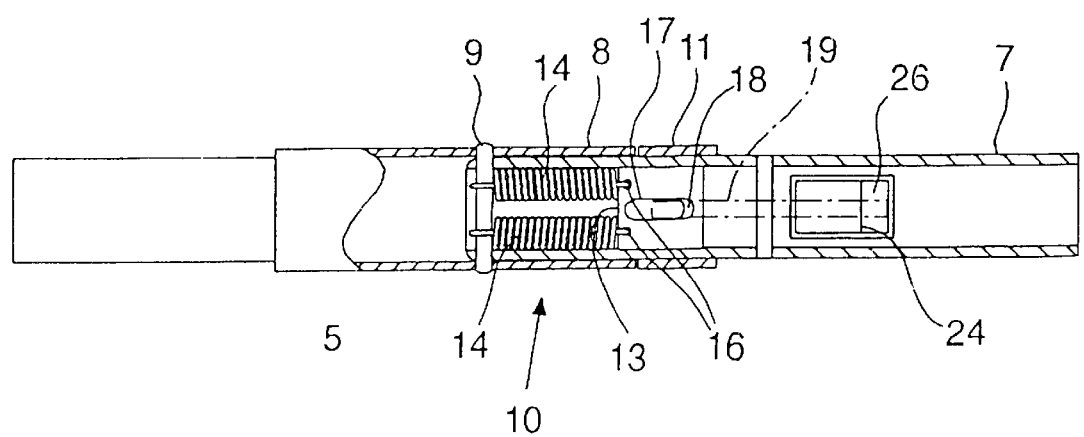
FIG. 4

WHEELBARROW HANDLE

FIELD OF THE INVENTION

The present invention relates to wheelbarrow handles and in particular to wheelbarrow handles having pivoting grips to facilitate dumping.

BACKGROUND OF THE INVENTION

The typical wheelbarrow, with its rigid handles, requires a great deal of strength and dexterity to control the transition from holding the handles horizontally while pushing the load to holding the handles vertically while dumping the load. Prior art devices, such as those disclosed in U.S. Pat. No. 1,485,179 issued to Jacob Fink on Feb. 26, 1924, U.S. Pat. No. 2,901,263 issued to Peter Van Loon on Aug. 25, 1959, U.S. Pat. No. 3,173,705 issued to DeGraff Du Puy on Mar. 16, 1965 and U.S. Pat. No. 4,941,956 issued to Larry Vittone on Aug. 28, 1990, have all been attempts to facilitate this process by providing pivoting hand grips. By providing hand grips that are pivotally mounted on the outer ends of the wheelbarrow handles, the dumping action is facilitated because the person using the wheelbarrow maintains a constant grip throughout the dumping process. The individual guiding the wheelbarrow simply lifts upwardly while pivoting the handle grip, thereby avoiding the difficult transition form a forehand grip to a backhand grip while at the same time trying to lift the wheelbarrow. Back and muscle injury caused by over extension of the arms and body during standard dumping are eliminated because the arms of an individual using the present invention remain relatively close to his hips at all times. The wheelbarrow hand grips disclosed in the Du Puy and Vittone patents are structurally different than the standard hand grips and are freely rotatable at all times, thereby making it relatively difficult to hold and manoeuver the wheelbarrow during regular usage. The Van Loon and Fink hand grips look and feel like standard hand grips, but the Van Loon grip is freely rotatable which causes difficulties in manoeuverability and the Fink device only provides a spring catch, which is awkward to disengage when required and occasionally disengages when not required.

SUMMARY OF THE INVENTION

An object of the present invention is to overcome the shortcomings of the prior art by providing wheelbarrow handle grips, which are pivotally mounted on the outer free ends of wheelbarrow handles, that can be locked in position when pushing a load in the wheelbarrow and easily disengaged to pivot freely when dumping the load.

Another object of the present invention is to provide pivoting wheelbarrow grips that can be mounted on existing wheelbarrow handles or mounted during original construction.

Accordingly, the present invention relates to a wheelbarrow handle device including grips means pivotally mounted on the outer free end of a wheelbarrow handle; lock means for securing said grip means from rotation relative to the wheelbarrow handle; release means, on said grip means, for manually disengaging said lock means whereby said grip means can be pivoted relative to the wheelbarrow handle to facilitate dumping the wheelbarrow.

BRIEF DESCRIPTION OF THE DRAWINGS

The invention will be described in greater detail with reference to accompanying drawings which illustrate a preferred embodiment of the invention and wherein:

FIG. 3 is a side view of the wheelbarrow handle device of the present invention;

FIG. 4 is a plan view of the device of FIG. 3; and

DETAILED DESCRIPTION OF A PREFERRED EMBODIMENT

Figure 1:
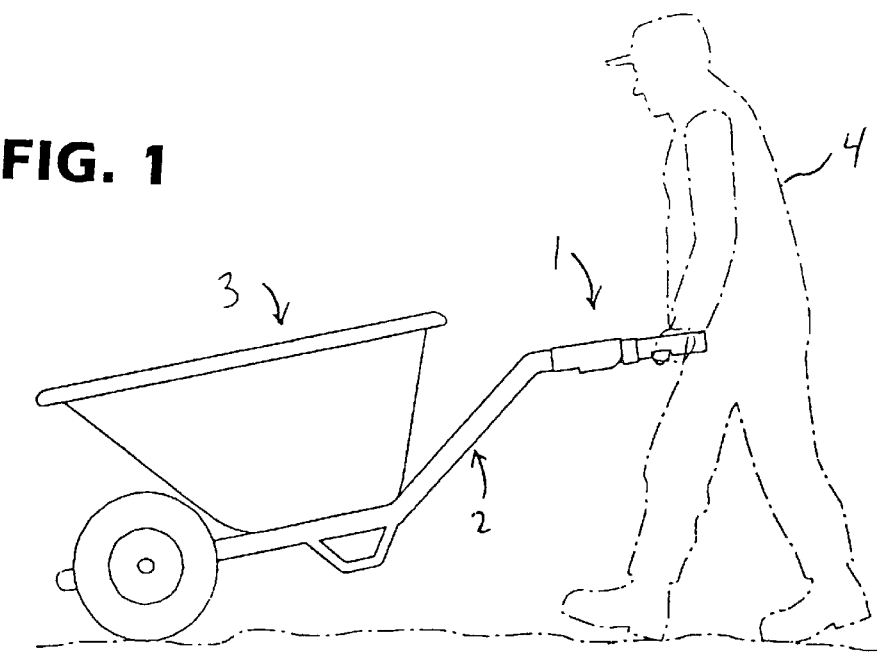
FIGS. 1 and 2 are side views of the wheelbarrow handle device in accordance with the present invention mounted on a wheelbarrow handle shown in the travelling and dumping positions, respectively.
Figure 2:
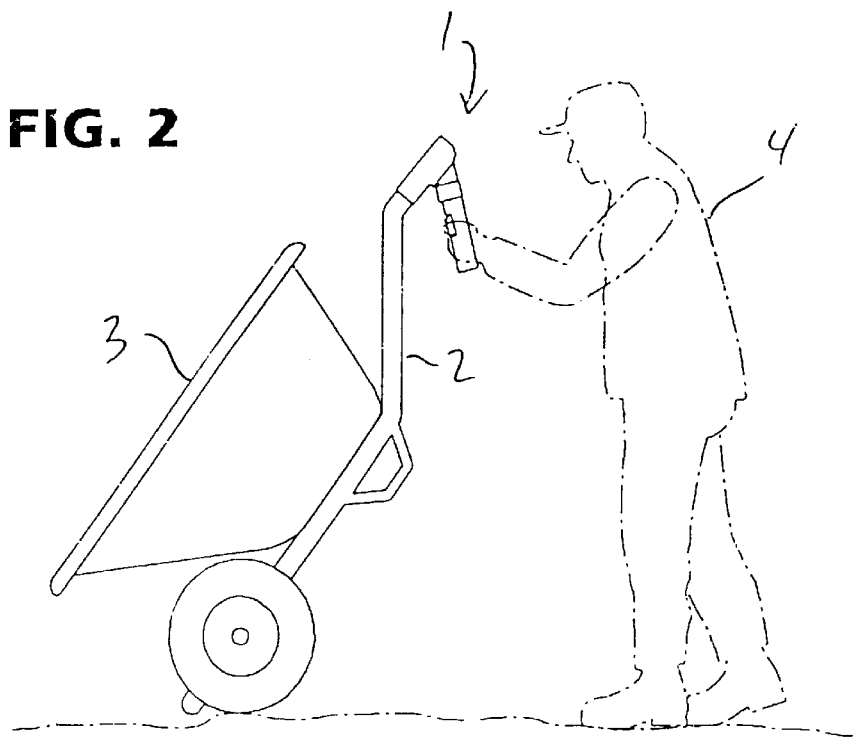

The wheelbarrow handle device, generally indicated at 1, is mounted on the outer end of a handle 2 of a wheelbarrow 3 (FIG. 1). The device 1 can be retrofit on an existing wheelbarrow handle using any one of several known methods or be a part of the original assembly. When a load is being moved the handle device 1 is locked in the horizontal or travelling position (FIG. 1) but when the load is dumped the handle device 1 is pivoted about a horizontal axis perpendicular to the handle 2, to the vertical or dumping position (FIG. 2). The handle device 1 enables the wheelbarrow handler 43 to maintain a constant grip throughout the process and provides a smooth transition between the travelling position and the dumping position.

With reference to FIGS. 3 and 4, the wheelbarrow handle device 1 includes a sleeve 5, one end 6 of which receives the outer end of the wheelbarrow handle 2, and a hand grip 7, pivotally mounted proximate the middle of the sleeve 5 by a pin 9. The other end 8 of the sleeve 5 has an open bottom to enable the hand grip 7 to pivot downwardly but has a closed top to prevent the hand grip from rotating upwardly. A locking mechanism, generally indicated at 10, prevents the hand grip 7 from pivoting relative to the sleeve 5 and includes a rectangular tongue 11 slidable in a slot 12 in the hand grip 7 and a rectangular groove 13 formed in the sleeve 5. Springs 14, fixed on one end to the pin 9 and on the other end through holes 16 in the tongue 11, bias the tongue 11 into the groove 13. A hole 17 in the tongue 11 has a sloped rear wall defining a cam surface 18. A release mechanism for unlocking the hand grip 7 from the sleeve 5 is comprised of a lever 19, pivotally mounted to the hand grip 7 by pin 21. One end 22 to the lever 19 includes a cam surface 23 for engagement with the cam surface 18 of the tongue 11. The other end 24 of the lever 19, which extends out of a hole 26 in the hand grip 7, includes a semi-spherical surface 27 for engagement with the hand of an individual (FIGS. 1 and 2) using the device 1.

Figure 5:
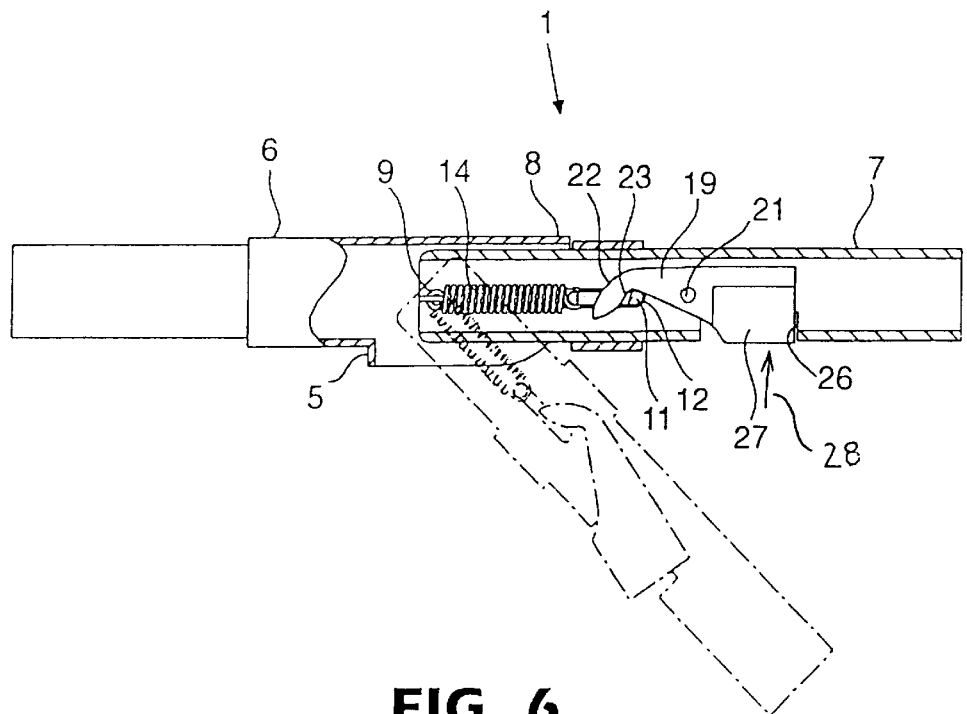
FIGS. 5 and 6 are side views illustrating the range of motion of the device of FIG. 3.
Figure 6:
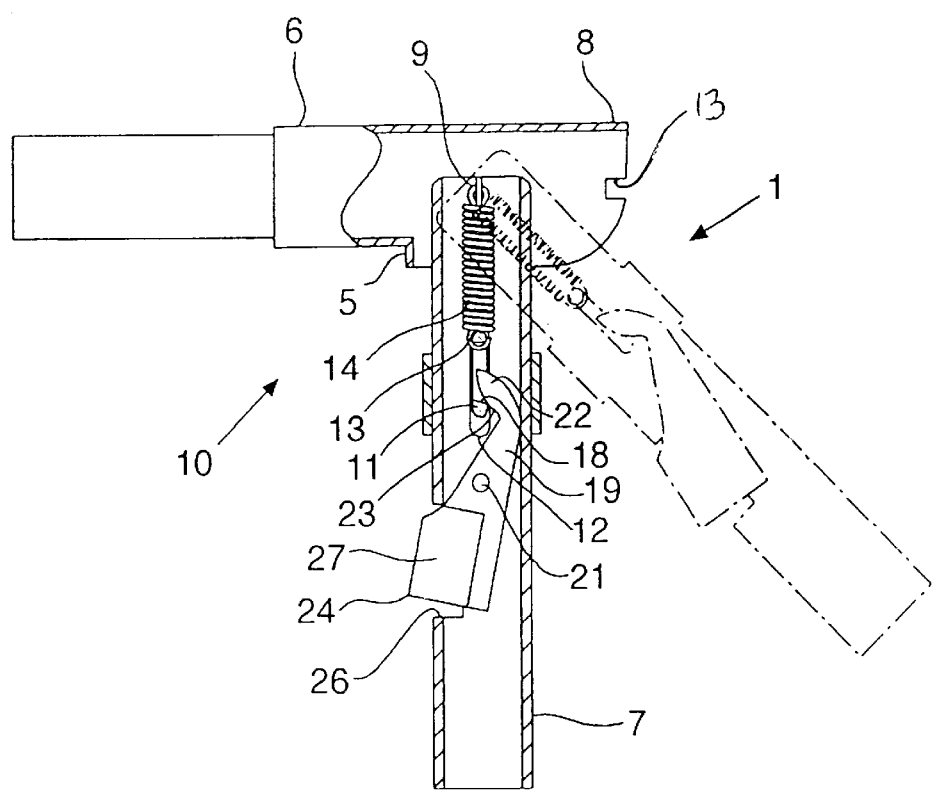

With reference to FIG. 5 and 6, if a sufficient amount of force is applied to the end 24 of the lever 19 in the direction of arrow 28, the cam surface 23 on the end of the lever 22 engages the cam surface 18 on the tongue 11, thereby overcoming the force supplied by springs 14 and sliding the tongue 11 out of the groove 13. The hand grip 7 is then free to rotate relative to the sleeve 5. This action can be performed with minimal finger movement while a generally constant grip is maintained on the hand grip 7. A load in the wheelbarrow 3 can then be dumped with relative ease with a constant grip and in a smooth motion.

I claim:

1. A wheelbarrow handle device including grip means pivotally mounted on the outer free end of a wheelbarrow handle; lock means for securing said grip means from rotation relative to the wheelbarrow handle; release means, on said grip means, for manually disengaging said lock means whereby said grip means can be pivoted relative to the wheelbarrow handle to facilitate dumping the wheelbarrow.

2. A device according to claim 1 including sleeve means, one end of which is mounted on the outer free end of a wheelbarrow handle and wherein said grip means is pivotally mounted on the other end of said sleeve means.

3. A device according to claim 2 wherein said lock means includes groove means in said sleeve means; tongue means slidable on said grip means for engagement with said groove means; and spring means biasing said tongue means into said groove means.

4. A device according to claim 3 wherein said release means includes lever means pivotally mounted on said grip means, one end of which extends into engagement with said tongue means, the other end of which is positioned to be manually engaged whereby a sufficient amount of force applied on the other end of said lever means overcomes the force of said spring means and results in the disengagement of said tongue means from said groove means enabling rotation of said grip means relative to said sleeve means.

5. A device according to claim 4 including first cam means on said one end of said lever means; and second cam means on said tongue means whereby actuation of said lever means causes said first cam means to engage said second cam means and subsequently the disengagement of said tongue means from said groove means.

6. A device according to claim 1 wherein said grip means is pivoted downwardly about a horizontal axis perpendicular to the wheelbarrow handle.

\* \* \* \* \*